United States Patent
Bulzacchelli et al.

(10) Patent No.: US 10,097,383 B1
(45) Date of Patent: Oct. 9, 2018

(54) HIGH SPEED DFES WITH DIRECT FEEDBACK

(71) Applicant: International Business Machines Corporation, Armonk, NY (US)

(72) Inventors: John Bulzacchelli, Somers, NY (US); Timothy Dickson, Danbury, CT (US); Mounir Meghelli, Tarrytown, NY (US); Jonathan Proesel, Mount Vernon, NY (US); Guanghua Shu, San Carlos, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/667,079

(22) Filed: Aug. 2, 2017

(51) Int. Cl.
*H04L 25/03* (2006.01)

(52) U.S. Cl.
CPC .............. *H04L 25/03057* (2013.01); *H04L 2025/03668* (2013.01)

(58) Field of Classification Search
CPC ......... H04L 25/03057; H04L 25/03146; H04L 2025/03617; H04L 25/03885; H04L 2025/03656; H04L 2025/03611; H04L 2025/03668
USPC ............................................. 375/229–233
See application file for complete search history.

(56) References Cited

U.S. PATENT DOCUMENTS

| 7,715,474 | B2 | 5/2010 | Park et al. |
| 7,924,912 | B1 | 4/2011 | Rokhsaz et al. |
| 9,444,588 | B1* | 9/2016 | Katic ..................... H04L 1/203 |
| 2008/0187036 | A1* | 8/2008 | Park ................. H04L 25/03146 |
| | | | 375/233 |

(Continued)

FOREIGN PATENT DOCUMENTS

| EP | 0782305 | A2 | 7/1997 |
| EP | 1065793 | A2 | 1/2001 |
| WO | 2003090389 | A1 | 10/2003 |

OTHER PUBLICATIONS

Bulzacchelli, et al., "Power-Efficient Decision-Feedback Equalizers for Multi-Gb/s CMOS Serial Links (Invited)", Radio Frequency Integrated Circuits (RFIC) Symposium, IEEE (2007), 4 pages.

(Continued)

*Primary Examiner* — Emmanuel Bayard
(74) *Attorney, Agent, or Firm* — Intelletek Law Group, PLLC; Gabriel Daniel, Esq.

(57) ABSTRACT

A method and system of equalizing in a decision feedback equalizer is provided. A plurality of adder circuits receives a digital code representing a previously decided symbol from an output of a prior path of a plurality of paths. A decision-making slicer circuit receives an input voltage and a first clock signal. The plurality of adder circuits receives a second clock signal and injects an offset current proportional to the digital code representing the previously decided symbol into a current injection input of the decision-making slicer circuit, at a first edge of the second clock signal. There is a predetermined skew between the first clock and the (Continued)

second clock to control a timing between the injection of the offset current of the plurality of adder circuits and the initiation of a decision-making phase of the decision-making slicer circuit.

24 Claims, 10 Drawing Sheets

(56) References Cited

U.S. PATENT DOCUMENTS

| | | | |
|---|---|---|---|
| 2008/0187082 A1* | 8/2008 | Bhoja | H04L 7/0062 375/371 |
| 2008/0310495 A1 | 12/2008 | Bulzacchelli et al. | |
| 2009/0086871 A1* | 4/2009 | Casper | G01R 31/31726 375/371 |
| 2009/0252215 A1 | 10/2009 | Bulzacchelli et al. | |
| 2012/0027074 A1 | 2/2012 | Raghavan et al. | |
| 2015/0180644 A1* | 6/2015 | Wang | H03L 7/00 375/355 |
| 2015/0312060 A1* | 10/2015 | Sinha | H04L 25/03057 375/233 |
| 2017/0180002 A1* | 6/2017 | Kiran | H04B 1/0007 |

OTHER PUBLICATIONS

Elhadidy, Osama, et al., "A 32 Gb/s 0.55 mW/Gbps PAM4 1-FIR 2-IIR tap DFE receiver in 65-nm CMOS", Symposium on VLSI Circuits Digest of Technical Papers, IEEE (2015), 2 pages.

Ren et al., "Precursor ISI Reduction in High-Speed I/O," Symposium on VLSI Circuits Digest of Technical Papers, IEEE (2007), 2 pages.

Zhang, et al. "Battery Swapping and Wireless Charging for a Home Robot System with Remote Human Assistance," IEEE Transactions on Consumer Electronics, vol. 59, Issue 4 (Nov. 2013), pp. 747-755.

\* cited by examiner

HIGH SPEED DFES WITH DIRECT FEEDBACK

STATEMENT REGARDING FEDERALLY SPONSORED RESEARCH OR DEVELOPMENT

This invention was made with Government support under Contract No. H98230-12-C-0325 with Defense Advanced Research Projects Agency (DARPA). The Government has certain rights in this invention.

BACKGROUND

Technical Field

The present disclosure generally relates to equalization techniques for high-speed data communications, and more particularly, to implementations of decision feedback equalizer (DFE) circuits with improved performance.

Description of the Related Art

Over the years, demand for high-bandwidth transmission of data has continuously increased. However, the limited bandwidth of electrical communication channels makes it difficult to increase data rates without approaching reliability roadblocks. Channel bandwidth degradation may result due to various physical effects, including skin effect, dielectric loss, and reflections due to impedance discontinuities. As real world communication channels are stressed with higher data rates, intersymbol interference (ISI) becomes a limiting factor. High data rate pulses transmitted through these channels broaden to greater than a unit interval (UI), thereby creating ISI with preceding bits (precursors) and succeeding bits (postcursors).

One way of compensating signal distortion due to ISI is to add equalization to the transmitting or receiving circuitry. Linear equalization may be sufficient for modest losses (e.g., 10 to 15 dB), but may not be effective for higher losses (e.g., 20 to 50 dB). In this regard, a decision feedback equalizer (DFE) is often included in the receiver to improve performance and increase maximum data rates, especially when the channel loss is high. A DFE is a type of nonlinear equalizer which uses feedback of previously detected symbols to estimate and cancel off ISI present in the received input signal. Because the previously detected symbols represent hard decisions (ideally noiseless), the DFE is able to cancel off the ISI in the received signal without amplifying noise or crosstalk, which is a fundamental advantage over linear equalizers.

SUMMARY

According to one embodiment, a decision feedback equalizer (DFE) is provided. The DFE includes a plurality of paths, each path having at least one adding slicer. Each adding slicer includes a decision-making slicer circuit having a first input, a second input coupled to a first clock signal that initiates a decision-making phase of the decision-making slicer circuit at a first edge of the first clock signal, an output, and a current injection input. There are a plurality of adder circuits configured to receive a respective bit of a digital code representing the previously decided symbol, fed back from an output of a prior path of the plurality of paths, and an input coupled to a second clock signal. The plurality of adder circuits are collectively configured to inject an offset current proportional to the digital code representing the previously decided symbol into the current injection input at a first edge of the second clock signal. There is a predetermined skew between the first clock signal and the second clock signal to control a timing between the injection of the offset current of the plurality of adder circuits and the initiation of the decision-making phase of the decision-making slicer circuit.

In one embodiment, the DFE is configured to receive non-return-to-zero (NRZ) or PAM4 signals at its first input.

In one embodiment, the first input of the decision-making slicer is differential, a reference input of the decision-making slicer is differential, the output of the decision-making slicer is differential, the current injection input is a differential input having a first node and a second node, and the digital code received at the plurality of adder circuits is a differential thermometer code.

In one embodiment, the plurality of paths includes a first path having three parallel adding slicers, each adding slicer having three adder circuits configured to receive the differential thermometer code from an output of a fourth path. There is a second path having three parallel adding slicers, each adding slicer having three adder circuits configured to receive the differential thermometer code from an output of the first path. There is a third path having three parallel adding slicers, each adding slicer having three adder circuits configured to receive the differential thermometer code from an output of the second path. The fourth path has three parallel adding slicers, each adding slicer having three adder circuits configured to receive the differential thermometer code from an output of the third path.

According to one embodiment, a method of equalizing in a decision feedback equalizer having a plurality of paths is provided. A plurality of adder circuits receive a digital code representing the previously decided symbol from an output of a prior path of the plurality of paths. Each adder circuit receives a respective bit of the digital code. A decision-making slicer circuit receives an input voltage. The decision-making slicer circuit receives a first clock signal operative to initiate a decision-making phase of the decision-making slicer circuit. The plurality of adder circuits receive a second clock signal operative to initiate an injection of an offset current into a current injection input of the decision-making slicer circuit. The offset current injected by the plurality of adder circuits is proportional to the digital code representing the previously decided symbol, at a first edge of the second clock signal. A predetermined skew is introduced between the first clock signal and the second clock signal.

In one embodiment, the digital code representing the previously decided symbol received by the plurality of adder circuits is a differential thermometer code. The input voltage received by the decision-making slicer circuit is differential. Further, the injected offset current proportional to the digital code is differential.

In one embodiment, the method further includes receiving, by the decision-making slicer circuit, a differential reference voltage. The decision-making slicer circuit compares the differential input voltage to the differential reference voltage, after receiving the offset current proportional to the digital code representing the previously decided symbol. Receipt of the injected offset current shifts a threshold of the decision-making slicer circuit up or down depending on a polarity of the injected offset current. The size of the threshold shift depends on the magnitude of the injected offset current.

According to one embodiment a decision feedback equalizer (DFE) is provided that includes a plurality of paths, each path having at least one adding slicer. Each adding slicer includes a decision-making slicer circuit having a first input, a second input coupled to a first clock signal that initiates a decision-making phase of the decision-making slicer circuit at a first edge of the first clock signal, an output, and a current injection input. There is an adder circuit configured to receive a respective bit of a digital code representing the previously decided symbol, fed back from an output of a prior path of the plurality of paths, and an input coupled to a second clock signal. The adder circuit is configured to inject an offset current proportional to the digital code representing the previously decided symbol into the current injection input, at a first edge of the second clock signal. There is a predetermined skew between the first clock signal and the second clock signal to control a timing between the injection of the offset current of the adder circuit and the initiation of the decision-making phase of the decision-making slicer circuit.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

DETAILED DESCRIPTION

Overview

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

The present disclosure relates to systems, circuits, and methods of implementing a decision feedback equalizer with a low bit error rate (BER). In a DFE, previous data decisions, sometimes referred to herein as symbols, are fed back with weighted tap coefficients and added to the received input signal. The tap coefficients are adjusted, to match the inverse of the channel characteristics. Consequently, ISI is removed from the received input signal such that a decision can be made on the received data symbol with a low BER.

Figure 1:
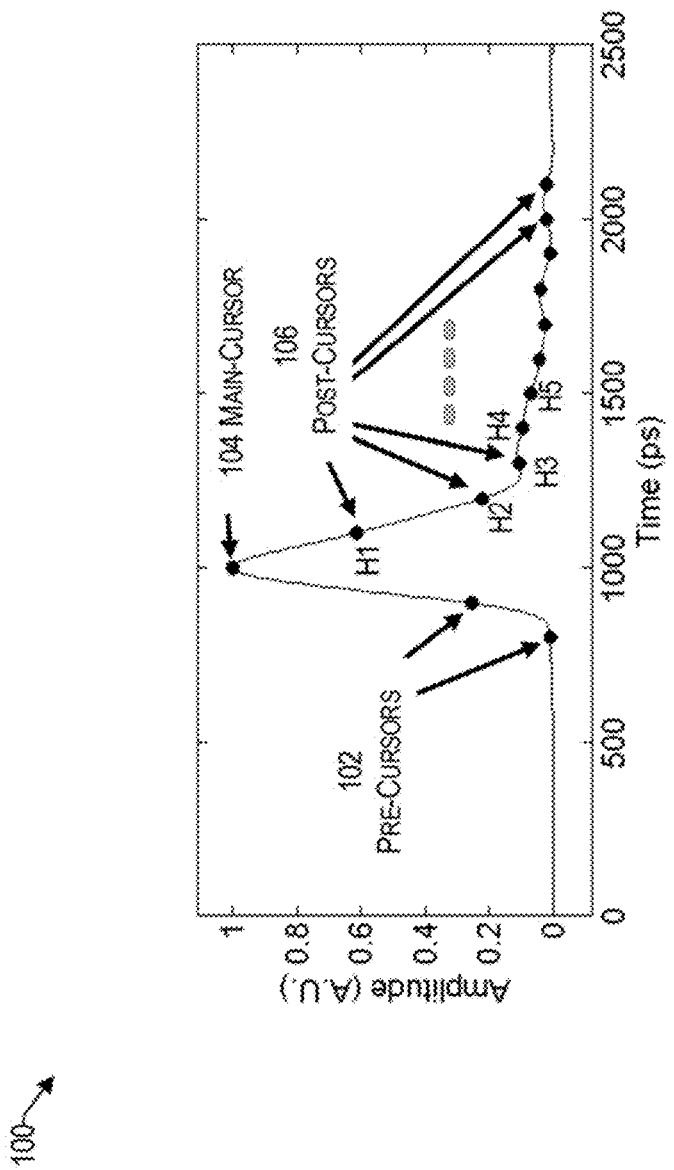
FIG. 1 illustrates an example pulse response of a lossy channel over time.

FIG. 1 illustrates an example pulse response of a lossy channel over time. The main cursor 104 is at the desired sample position for this pulse (representing a data symbol). The precursors 102 indicate how this pulse interferes with detection of the preceding data symbols. The postcursors 106 indicate how this pulse interferes with the succeeding data symbols. If the intersymbol interference is large enough, an eye diagram of the received data signal would be closed. Accordingly, equalization is used to recover the data symbols (e.g., bits).

A one tap DFE typically has only an H1 feedback component, where H1 represents the first postcursor, as illustrated in FIG. 1. In our example, the H1 feedback tap cancels the interference from the previous data symbol (previous bit in the case of NRZ signaling). If, as shown in FIG. 1, the first postcursor due to the channel is a positive signal, the weighting coefficient of the H1 feedback tap will be negative so that a compensating quantity is subtracted from the data input value of the next received data symbol. However, in more sophisticated systems that are more accurate, multiple tap DFEs can be used. For example, a two tap DFE has a second (H2) feedback tap, where H2 represents the second postcursor. Accordingly, the data decision fed back in the H2 tap represents a data symbol which had been decided two UI earlier than the current decision (and one UI earlier than the data decision fed back in the H1 tap). The number of DFE taps depends on the number of postcursors that are desired to be subtracted from the new data input value.

A challenge in the design of a DFE is to ensure that the feedback signals are accurately established at the decision-making slicer input (a decision portion of the DFE—discussed in more detail later) before the next symbol decision is made. Feedback timing constraints can be relaxed by adopting a technique known as speculation or loop unrolling. For example, both +H1 and −H1 postcursor symbols are added as dc offsets to the data input, and both sums are sliced to binary values (i.e., 1 or 0). Once the previous data bit is known, a MUX selects the decision-making slicer output corresponding to the correct polarity of H1 feedback.

While the speculation approach may be effective for non-return-to-zero (NRZ) systems, speculation becomes increasingly costly for PAM4 and higher systems. For example, in a PAM4 system, four distinct pulse amplitudes are used to convey the information. Since the previous symbol may have four possible different values, speculation of just one tap requires four parallel paths instead of the two mentioned above for NRZ. Moreover, the number of parallel paths required for speculation in a PAM4 system grows as $4^M$, where M is the number of DFE taps implemented by speculation. For values of M equal to 2 or higher, the complexity, hardware overhead, and potential power consumption would become impractical with traditional DFE architectures.

The DFE equalizer discussed herein includes a plurality of paths, each path having at least one adding slicer. In one embodiment, each adding slicer comprises a decision-making slicer circuit having a differential input, a differential reference input, a differential output, and differential current injection inputs having a first node and a second node. Each adding slicer also includes a plurality of adder circuits configured to receive a differential thermometer code representing the previously decided symbol, from an output of a prior path of the plurality of paths, and collectively inject an offset current (representing the H1 tap and proportional to the differential thermometer code) into the differential current injection inputs.

Reference now is made in detail to the examples illustrated in the accompanying drawings and discussed below.

Example Architecture

Figure 2:
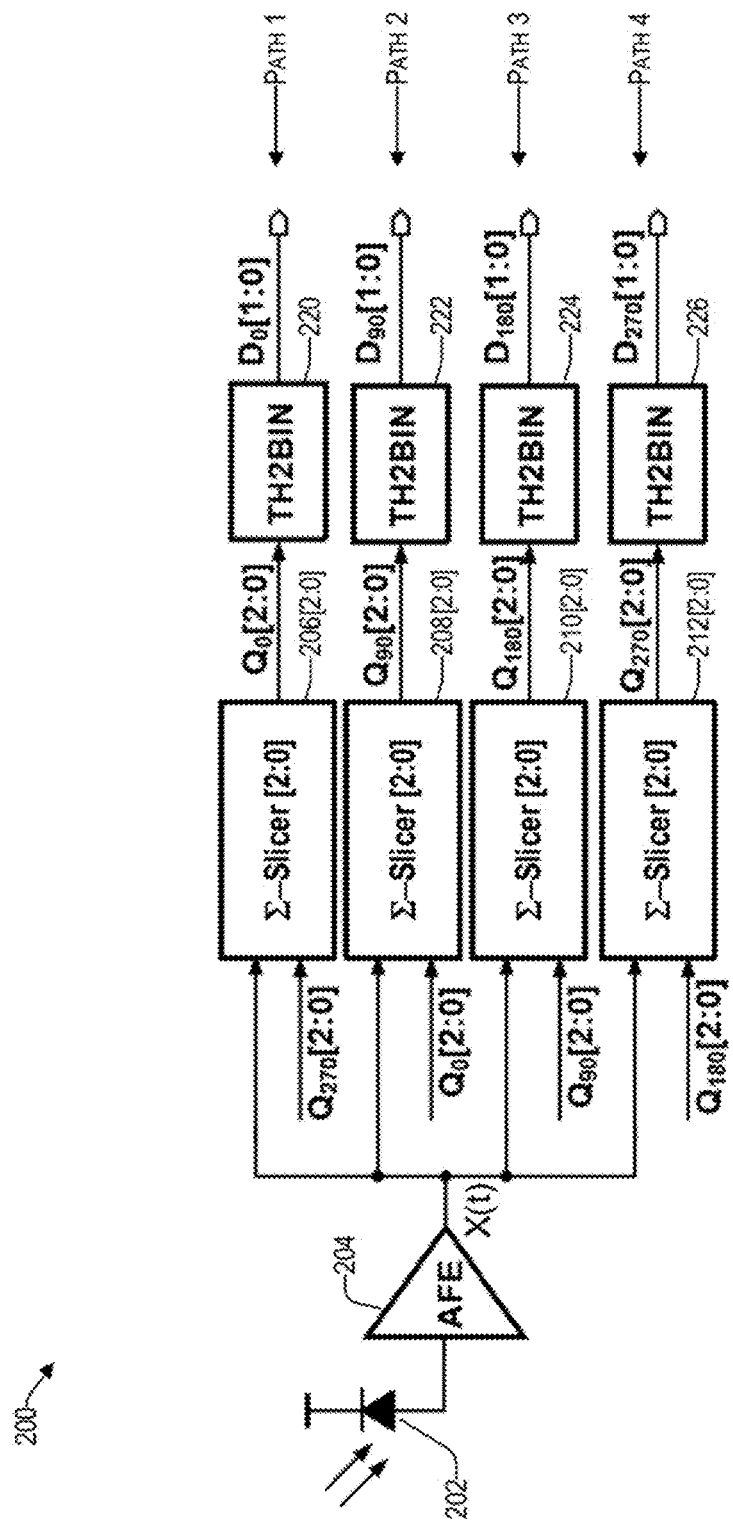
FIG. 2 illustrates an example architecture for implementing a PAM4 quarter rate decision feedback equalizer.

The DFE in accordance with the present principles provides for a parallelized serial link receiver. To that end, FIG. 2 illustrates an example architecture 200 for implementing a PAM4 quarter rate DFE. The quarter-rate architecture 200 is selected to minimize clocking power and to operate the latches with relaxed cycle times (where they can achieve better input sensitivity). The direct DFE architecture uses no look-ahead architecture, so no additional power is consumed for the redundant hardware. Also, higher order taps can be easily added without changing timing constraints. For example, a two-tap DFE may be selected because it is sufficient for channels of short to medium distance. Other configurations such as additional taps and accommodations for longer distances are within the scope and spirit of the present principles.

The four parallel paths of FIG. 200 allow the processing of a high-speed signal to be divided into four separate paths. For example, instead of operating a single path at a very high frequency (e.g., 28 giga-symbols/second), four separate paths are used to process the signal X(t)) to divide the processing load, each path operating at ¼ the original high frequency (i.e., 7 giga-symbols/second in the present example). For example, the first path takes a sample of a first time period, sometimes referred to herein as a first phase, the second path takes a sample of a second time period (e.g., second phase), the third path takes a sample of the third time period (e.g., third phase), and the fourth path takes a sample of the fourth time period (e.g., fourth phase). Four cycles later, the first path takes a sample of the next first time slot, and so on, continuing the interleaved architecture. By virtue of using a PAM4 architecture, X(t) accommodates four signal levels instead of two, with each signal level corresponding to a two-bit symbol.

Since we are using a PAM4 system in the example of FIG. 2, each path includes three separate adding slicers, collectively providing a 3 bit output $Q_N[2:0]$, which is fed to a thermometer to binary code converter, providing a 2 bit output $D_N[1:0]$ for each sample, where N represents the phase of operation of the adding slicer. Each adding slicer (e.g., 206) is a merged summer and slicer that reduces latency, as will be discussed in more detail later. It should be noted that the reason why three adding slicers (e.g., [2:0]) are used in each path, is to be able to discern a PAM4 signal. For example, at least three reference levels are used for comparison to be able to identify the four possible signal levels.

By way of example only and not by way of limitation, the architecture 200 includes a photodiode 202 so that the architecture 200 can act as an optical receiver. Photocurrent representing the high-speed serial data is provided by the photodiode 202 to an analog front end (AFE) 204, which provides a signal X(t) at its output that includes ISI from previous data symbols. In other embodiments, the AFE 204 may be configured to receive electrical input signals, and the photodiode 202 can be eliminated.

Figure 3:
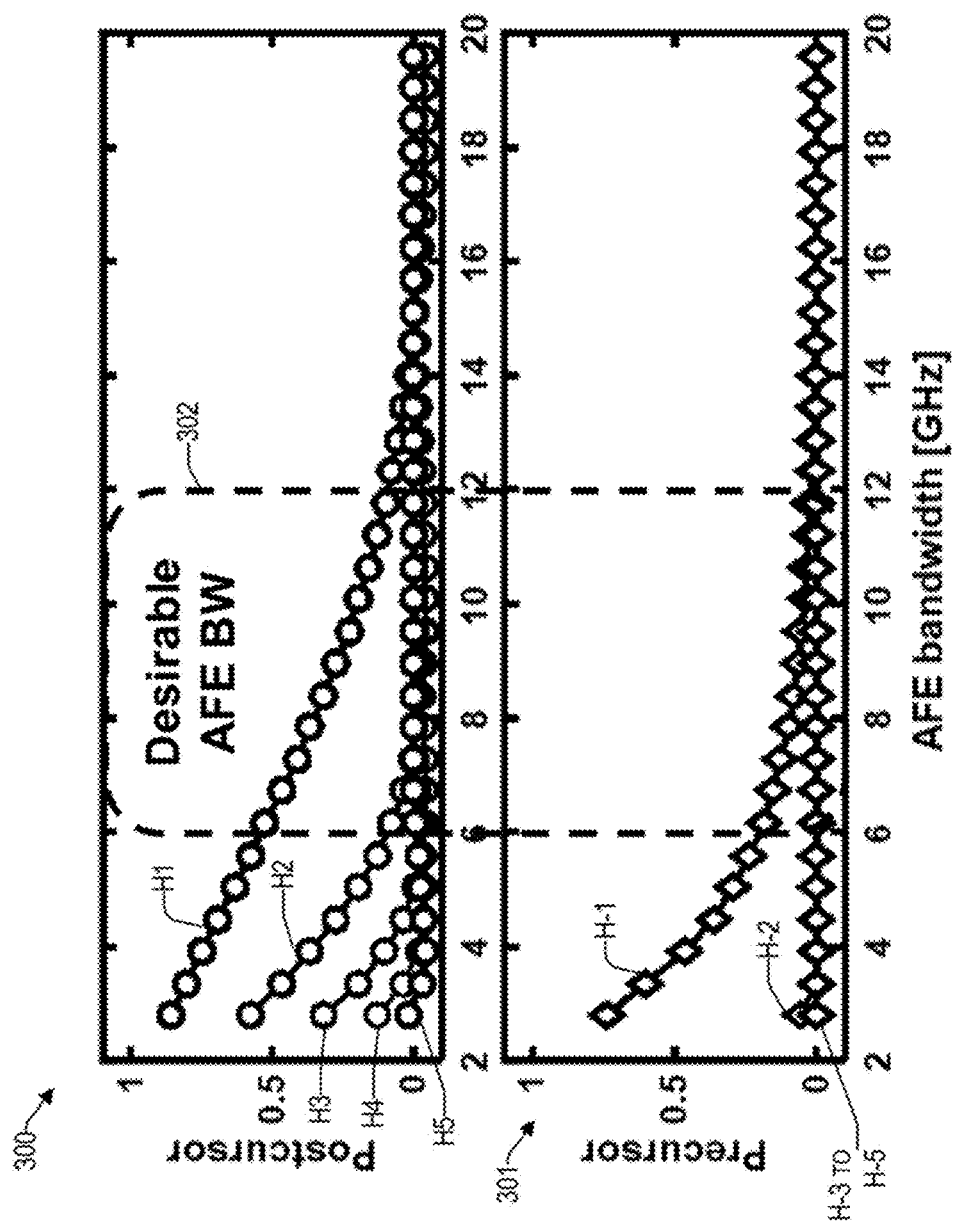
FIG. 3 illustrates an example graph that explains an optimization of an analog front end bandwidth for a decision feedback equalizer.

The analog front end 204 includes analog signal conditioning components that provide an interface between the photodiode 202 and the adding slicer(s) 206 to 212. FIG. 3 illustrates an example graph that explains the optimization of the analog front end bandwidth for the DFE. In particular, FIG. 3 illustrates the magnitudes of the postcursors 300 and the precursors 301 as a function of the bandwidth of the analog front end 204. As the bandwidth is decreased, the noise level and the sensitivity of the system are improved. However, a decreased bandwidth spreads the pulse over more unit intervals, making the postcursors and the precursors larger. Accordingly, in one embodiment, the bandwidth of the analog front end 204 is configured such that the first postcursor H1≤0.5 to avoid excessive error propagation, which may lead to bursts of errors in a DFE. In the example of FIG. 3 a bandwidth of 6 to 12 GHZ is used such that all significant precursors and postcursors (e.g., H-1, H-2, and H1 to H5) have magnitudes less than 0.5.

Referring back to FIG. 2, the four quadrature paths include a first path having three parallel adding slicers 206[2:0] configured to sum the input signal X(t) with a first feedback signal fed back from an output $Q_{270}[2:0]$ of three parallel adding slicers of a fourth path. There is a second path having three parallel adding slicers 208[2:0] configured to sum the input signal X(t) with a second feedback signal fed back from an output $Q_0[2:0]$ of the three parallel adding slicers 206[2:0] of the first path. There is a third path having three parallel adding slicers 210[2:0] configured to sum the input signal X(t) with a third feedback signal fed back from an output $Q_{90}[2:0]$ of the three parallel adding slicers 208[2:0] of the second path. There is a fourth path having three parallel adding slicers 212[2:0] configured to sum the input signal X(t) with a fourth feedback signal fed back from an output $Q_{180}[2:0]$ of the three parallel adding slicers 210[2:0] of the third path. In one embodiment, each path includes a two-bit thermometer to binary converter, represented by TH2BIN 220 to 226, respectively. Thus, each 3-bit output Q[2:0] provided by the adding slicer is converted to a 2-bit binary number via a corresponding thermometer to binary converter (e.g., TH2BIN 220 to 226, respectively).

While the example of FIG. 2 illustrates the thermometer code to be fed back to the adding slicers, in one embodiment, the binary code (i.e., at the output of each thermometer to binary code converter) is fed back to the corresponding adding slicer. However, such approach would introduce an additional delay, which may be less attractive in some applications. While a receiver with a PAM4 DFE architecture is depicted in FIG. 2, the concepts discussed herein can be extended to higher levels of PAM signaling or even single bit NRZ.

Embodiments of the present application can take the form of an entirely hardware embodiment, an entirely software embodiment or an embodiment including both hardware and software elements. In a preferred embodiment, the present application is implemented in hardware however, elements may be implemented in software, which may include but is not limited to firmware, resident software, microcode, etc. Thus, the present application may be a system, a method, and/or a computer program product at any possible technical detail level of integration. The computer program product may include a computer readable storage medium (or media)

having computer readable program instructions thereon for causing a processor to carry out aspects of the present application.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present application may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present application.

Aspects of the present application are described herein with reference to block diagrams of methods, apparatus (systems), and computer program products according to embodiments of the application. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Example Adding Slicer

Figure 4:
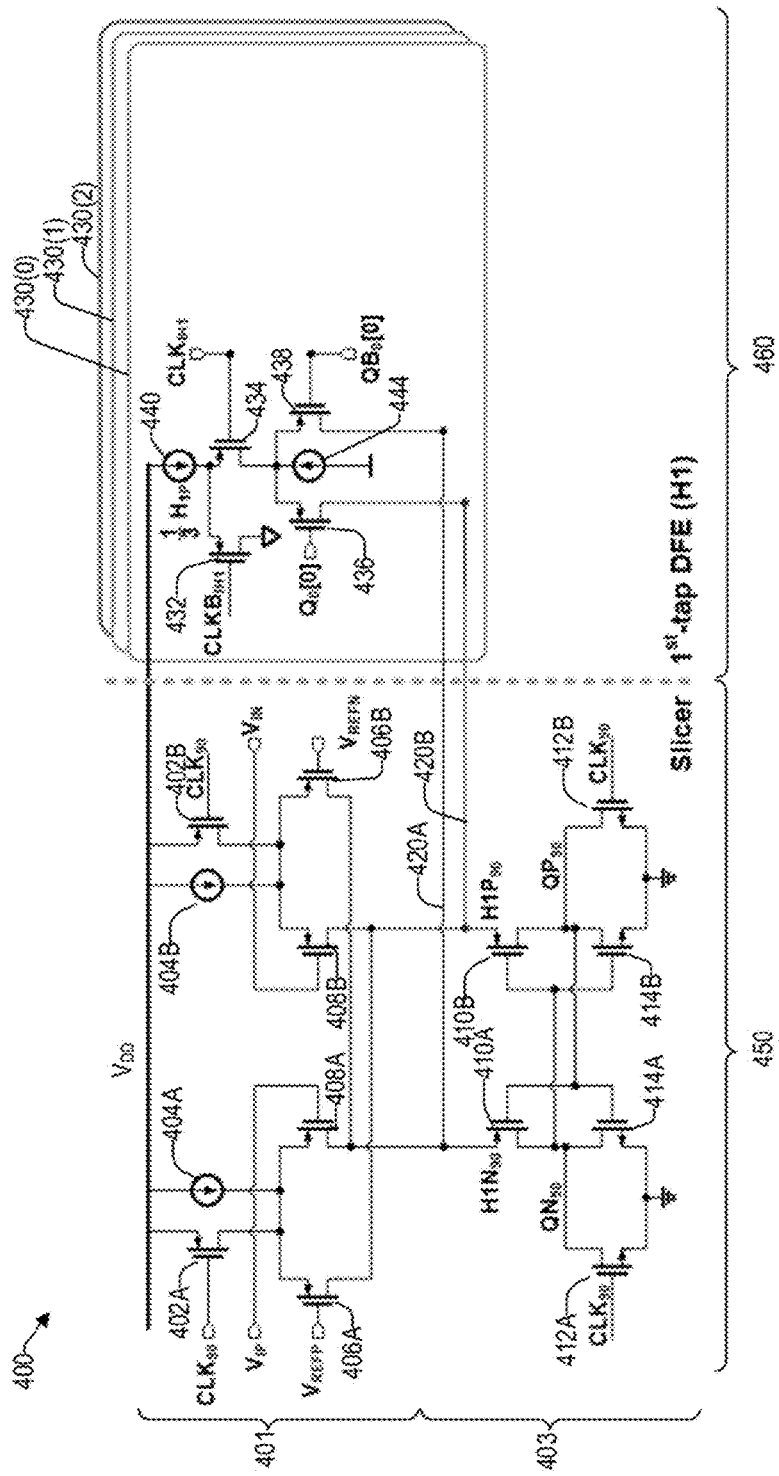
FIG. 4 illustrates a circuit implementation of an adding slicer, consistent with an illustrative embodiment.

FIG. 4 illustrates a circuit implementation of an adding slicer 400, consistent with an illustrative embodiment. The adding slicer 400 has a decision-making slicer circuit 450, sometimes referred to herein as a latch (i.e., on the left side of the dotted line) and 1st-tap DFE (H1) feedback circuit, comprising three feedback adder circuits 430(0) to 430(2). In one embodiment, the decision-making slicer circuit 450 is a StrongArm-type latch that lends itself in serial link receiver applications. While a single tap is illustrated in FIG. 4 by way of example, it will be understood that higher order taps are supported as well.

The decision-making slicer circuit 450 comprises an input stage 401 and a latching circuit 403. The input stage 401 is configured to determine whether a high or low is provided in the input differential signal $V_{IP}/V_{IN}$ when the first input clock $CLK_{90}$ transitions to a low level. The latching circuit 403, comprising cross-coupled inverters, is configured to store the identified signal and provide a rail to rail differential signal at the output $QN_{90}$ and $QP_{90}$ when the first input clock $CLK_{90}$ transitions to a low level. Both the input stage 401 and the latching circuit 403 have left and right halves that are mutually similar and have been matted together to form a differential configuration. Accordingly, aspects of decision-making slicer circuit 450 will be discussed in the context of the left half and not repeated for the right half, for brevity.

In one aspect, the decision-making slicer circuit 450 is essentially a highly sensitive latch. The decision-making slicer 450 includes a clocked differential input comparator stage 401, referred to herein as an input stage, comprising transistors 406A-408A and 406B-408B. It produces a differential output at the output nodes $QN_{90}$ and $QP_{90}$, depending on whether the differential input voltage $V_{IP}$-$V_{IN}$ is above or below the differential reference voltage $V_{REFP}$-$V_{REFN}$. In some embodiments, the voltage levels of $V_{REFP}$ and $V_{REFN}$ are programmable, thereby allowing to set different thresholds. For a PAM4 system, there would be 3 of such adding slicers 400 to discern the four different voltage levels.

Accordingly, the input stage of the decision-making slicer circuit 450 uses a couple of differential pairs in the input stage having two differential pairs 401 (rather than a single differential pair) connected as a differential comparator structure, so that the input-referred threshold of the latch can be adjusted by setting reference voltages $V_{REFP}$ and $V_{REFN}$. In particular, the latch makes a binary "one" decision when the differential input voltage ($V_{IP}$-$V_{IN}$) exceeds $V_{REFP}$-$V_{REFN}$ and makes a binary "zero" decision when the differential input voltage ($V_{IP}$-$V_{IN}$) is below $V_{REFP}$-$V_{REFN}$. This binary decision appears at the regenerative output nodes ($QP_{90}$ and $QN_{90}$) a short time after the latch is activated (by switching $CLK_{90}$ low). Here the differential comparator structure of the input stage 401 is used to set the threshold to a value between two of the levels of the received PAM4 signal.

As mentioned earlier, three copies of this latch are used to slice the four levels of a PAM4 symbol, with each of the three having a different threshold set by its own $V_{REFP}$ and $V_{REFN}$ values. While the $V_{REFP}$ and $V_{REFN}$ reference voltages can be used to set the input-referred latch thresholds to values between the PAM4 signal levels, in one embodiment, random offsets in the latch due to device mismatches can be also be compensated by appropriate adjustment of $V_{REFP}$ and $V_{REFN}$.

For example, in a first phase, when $CLK_{90}$ is low, transistors 402A/B (e.g., P-channel field effect transistors (PFETS) in the example of FIG. 4) are ON, allowing the clocked differential pairs of the input stage 401 to determine whether a HIGH or LOW should be stored. During the same phase, when $CLK_{90}$ is low, the latching circuit 403 amplifies the signal to rail-to-rail levels (e.g., with one output at $V_{DD}$ and the other output at ground). During the second phase, when $CLK_{90}$ is high, transistors 402A/B are OFF, and transistors 412A/B (e.g., N-channel field effect transistors (NFETs) in the example of FIG. 4) are ON, so that the output nodes $QN_{90}$ and $QP_{90}$ are reset to the second supply (e.g., ground).

The input stage 401 is configured to receive a differential input voltage $V_{IP}/V_{IN}$, a differential reference voltage $V_{REFP}/V_{REFN}$, and a first clock signal $CLK_{90}$. When transistors 402A/B are ON (i.e., CLK90 is low), the differential input voltage $V_{IP}$ $V_{IN}$ is compared to the differential reference voltage $V_{REFP}$-$V_{REFN}$ to determine whether the differential signal at the differential input nodes is above (or below) the latch threshold and a binary "one" (or "zero") decision should be made. The first side (e.g., left) of the input stage 401 comprises a first transistor 402A having a source coupled to a first supply (e.g., $V_{DD}$) and a gate coupled to first clock signal ($CLK_{90}$). The second transistor 406A has a source coupled to the drain of the first transistor 402A, a gate coupled to a positive side of the differential reference voltage $V_{REFP}$, and a drain coupled to the second current injection node 420B ($H1P_{90}$). The third transistor 408A has a source coupled to the drain of the first transistor 402A, a gate coupled to a positive side of the differential input voltage $V_{IP}$, and a drain coupled to the first current injection node 420A ($H1N_{90}$). In one embodiment, there is a current source 404A. The second differential pair of the input stage 401 has substantially similar components.

The cross-coupled inverters forming a latching circuit 403 include a first side (e.g., left) and a right side (e.g., right) that are mutually similar. The first (i.e., left) side comprises a first transistor 410A having a source coupled to the first current injection node 420A, a drain coupled to a negative side of a differential output ($QN_{90}$), and a gate coupled to a positive side of the differential output ($QP_{90}$). There is a second transistor 414A having a drain coupled to the negative side $QN_{90}$ of the differential output signal, a gate coupled to the positive side ($QP_{90}$) of the differential output, and a source coupled to a second supply, which may be ground. In one embodiment, there is a third transistor 412A having a drain coupled to the negative side $QN_{90}$ of the differential output, a gate coupled to the first clock signal CLK90, and a source coupled to the second supply (e.g., ground). As discussed previously, the third transistor 412A is operative to reset the latching circuit 403 during the second phase, when $CLK_{90}$ is high.

The adding slicer 400 includes a $1^{st}$-tap DFE (H1) feedback circuit comprising a plurality of adder circuits. For example, for a PAM4 input signal $V_{IP}$-$V_{IN}$, there are three adder circuits 430(0) to 430(2). In one embodiment, these three adder circuits 430(0) to 430(2) are controlled by three thermometer code bits $Q_0[2:0]$ of FIG. 2, which collectively represent the previously decided PAM4 symbol being fed back (for DFE operation). Consider, for instance, the adder copy controlled by $Q_0[0]$ (i.e., 430(0)). If $Q_0[0]$ is low (and $QB_0[0]$ is high), a current equal to $H_{1P}/3$, represented by current source 440, is steered into the second current injection node 420B. The change in latch threshold has the opposite polarity if $Q_0[0]$ is high (and $QB_0[0]$ is low) since in this case a current equal to $H_{1P}/3$ is steered into the first current injection node 420A. The effective slicing level (threshold) is moved up or down depending on the polarity of the feedback bit. Since the outputs of the three adder circuits 430(0) to 430(2) of the 1st-tap DFE (H1) feedback circuit 460 all converge together (i.e., at the first and second current injection nodes 420A and 420B, respectively), their injected currents are added together. The net effect on the latch 450 threshold is proportional to the level of the previous PAM4 symbol.

Accordingly, the $1^{st}$-tap DFE (H1) feedback circuit 460 is configured to receive a digital code representing the previously decided symbol and determine (for each adder circuit 430(0) to 430(2)) whether to steer a DC offset current 440 of $H_{1P}/3$ to the first current injection node 420A or the second current injection node 420B of the decision-making slicer 450, based on the received digital code representing the previously decided symbol (e.g., differential bit $Q_0[0]$ and $QB_0[0]$ of the differential digital code, for adder 430(0)). In this way, each of the adders 430(0) to 430(2) can inject the DC offset current into one of the first current injection node 420A or second current injection node 420B, without the use of an amplifier that may introduce a path delay, and hence, slow down the system 400.

Each adder circuit (i.e., 430(0) to 430(2)) comprises a current source 440 having a first node coupled to the first supply (e.g., $V_{DD}$) and operative to provide a current component of the desired H1 feedback signal applied to the latch 450. For a PAM4 system, there are three adder circuits for each adding slicer 400. Accordingly, each current source 440 provides ⅓ the H1 signal. There is a first transistor 434 having a source coupled to the second node of the current source, and a gate coupled to a second clock (CLK$_{IH1}$). In one embodiment, the adder 430(0) further comprises a transistor 432 having a source coupled to the second node of the current source, a gate coupled to an inverse of the second clock (CLKB$_{IH1}$) and a drain coupled to the second supply, which may be ground.

There is a third transistor 436 having a source coupled to the drain of the first transistor 434, a gate configured to receive a bit (Q$_0$[0]) of the digital code representing the previously decided symbol signal, and a drain coupled to the second current injection node 420B. There is a fourth transistor 438 having a source coupled to the drain of the first transistor 434, a gate configured to receive an opposite polarity of a bit (QB$_0$[0]) of the digital code representing the previously decided symbol signal, and a drain coupled to the first current injection node 420A. Accordingly, the gates of the third and fourth transistors 436 and 438 are configured to receive a respective differential bit of the differential thermometer code.

Each feedback adder 430(0) to 430(2) injects a current into the first current injection node 420A or the second current injection node 420B of the decision-making slicer 450, respectively. Thus, the adder circuits 430(0) to 430(2) collectively receive the thermometer code representing the previous symbol and inject a DFE feedback current directly into the decision-making slicer 450 that is proportional to the previous symbol. The reason there are three of these adder circuits (i.e., 430(0), 430(1), and 430(2)) is because there are three bits in the thermometer code of the prior symbol. In each of the three adders, there is a current source 440 providing a current ⅓ H$_{1P}$ that is steered into the negative H1N$_{90}$ (420A) or positive H1P$_{90}$ (420B) current injection nodes of the decision-making slicer 450.

For example, when clock CLK$_{IH1}$ is high (and CLKB$_{IH1}$ is low), then the current from current source 440 is routed to ground, thereby preventing the current from the current source 440 to affect the decision-making slicer circuit 450. However, when CLK$_{IH1}$ is low (and CLKB$_{IH1}$ is high), the current from the current source 440 can pass through the transistor 434 (e.g., a PFET) to be controlled by a differential transistor pair 436 and 438. In one embodiment, differential pair 436 and 438 comprises PFETS. For example, if Q$_0$[0] is low and QB$_0$[0] is high, then transistor 436 is ON and transistor 438 is OFF, thereby diverting the current from the current source 440 to the second current injection node 420B of the decision-making slicer circuit 450. Alternatively, if Q$_0$[0] is high and QB$_0$[0] is low, the current from the current source 440 is routed to the first current injection node 420A of the decision-making slicer circuit 450.

It should be noted that, while adder 430(0) may be routing current in one path (e.g., second current injection node 420B), the second and/or third adder circuits 430(1) and 430(2) may route their current to the same (e.g., second current injection node 420B) or the opposite (e.g., first current injection node 420A) node. In this way, four different levels of ISI compensation can be provided. Thus, maximum compensation can be achieved if all adders divert current to the same current injection node, namely first 420A or second 420B.

However, for an intermediate PAM4 signal level (which is not max or min), an intermediate level of compensation is achieved because two of the adders route the H$_{1P}$/3 current in one direction, while the remaining adder routes the H$_{1P}$/3 current in the other direction. Thus, the compensation is proportional to the symbol that is being compensated.

Accordingly, each output of an adder circuit 430(0) to 430(2), is injected directly into the current injection nodes 420A and 420B of its corresponding decision-making slicer circuit 450. Significantly, a summing amplifier to sum the currents of the prior quadrant (i.e., provided via the adder circuits 430(0) to 430(2)), need not be used, thereby simplifying the architecture and improving the performance (i.e., speed) of a DFE. Thus, by virtue of injecting the DFE current, provided by the adder circuits 430(0) to 430(2) directly into the current injection nodes of the decision-making slicer, latency is reduced, and the DFE can be operated with high accuracy at enhanced operating speeds.

Figure 5A:
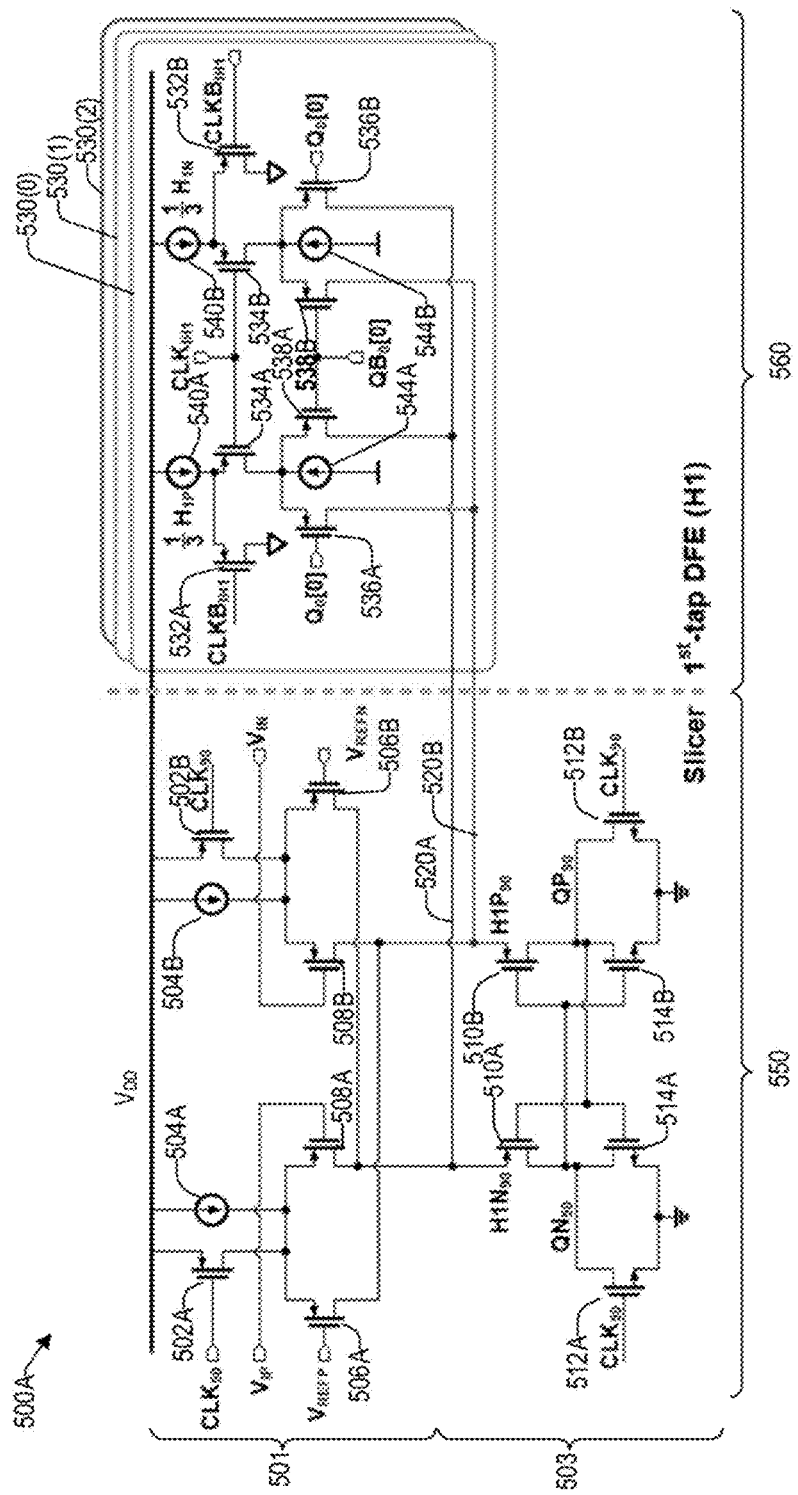
FIG. 5A illustrates an adding slicer, consistent with an illustrative embodiment.

Reference now is made to FIG. 5A, which illustrates an adding slicer 500A, consistent with another illustrative embodiment. The adding slicer 500A is substantially similar to that of FIG. 4, except that each adder 530(0) to 530(2) has a differential right portion. Put differently, each adder includes a left half and a right half that are mutually similar. The two halves complement one another in that the current contributions of the two halves of each feedback adder circuit to the decision-making slicer 550 subtract from each other. For example, consider the current sources 540A and 540B to be configured to provide a substantially similar current. Consider also that Qo[0] is low, thereby turning ON transistors 536A and 536B. Accordingly, the current from the current source 540A, having a current of H$_{1P}$/3 for a PAM4 architecture, would be routed to the second current injection node 520B, whereas a substantially similar current H$_{1N}$/3 from current source 540B would be routed to the first current injection node 520A of the decision-making slicer 550.

If H$_{1P}$ equals H$_{1N}$, the circuit remains balanced, and the injected current has no effect on the input-referred threshold of the latch. In other words, the effective DFE tap weight is zero. More generally, though, the currents H$_{1P}$ and H$_{1N}$ are unequal, so the injected currents imbalance the decision-making slicer circuit 550 and change the input-referred threshold of the latch by D. The change in latch threshold has the opposite polarity (−D) if Q$_0$[0] is high (and QB$_0$[0] is low). In this scenario, a current equal to H$_{1P}$/3 is steered into the first current injection node 520A while a current equal to H$_{1N}$/3 is steered into the second current injection node 420B. Similar to FIG. 4, the effective slicing level (threshold) is moved up or down depending on the polarity of the feedback bit. Since the outputs of the three adder circuits 530(0) to 530(2) of the 1st-tap DFE (H1) feedback circuit 560 all converge together (i.e., at the first and second current injection nodes 520A and 520B, respectively), their injected currents are added together. The net effect on the latch threshold is proportional to the level of the previous PAM4 symbol. Since the effective DFE tap weight is proportional to the difference H$_{1P}$−H$_{1N}$, both the magnitude and polarity of the H1 tap weight can be set by adjusting the values of the H$_{1P}$ and H$_{1N}$ current sources (e.g., via current digital to analog converters (DACs)). Other advantages of the fully balanced and differential tap structure of FIG. 5A is that capacitive feedthrough from gate-to-drain (e.g., from Q$_0$[0] and QB$_0$[0] to the first and second current injection nodes 520A and 520B) is cancelled to first-order, and the loading of the first and second current injection nodes 520A and 520B is inherently balanced.

While direct injection of the DFE feedback current into the first and second current injection nodes 520A and 520B of the decision-making latch 550 reduces loop latency, in one embodiment, improved accuracy at high operating speeds is obtained by adopting a return-to-zero (RZ) tap structure in which clocked differential pairs (controlled by $CLK_{IH1}$ and $CLKB_{IH1}$) steer current away from the lower differential pairs during part of the clock cycle (specifically while $CLK_{IH1}$ is high). The basic idea is that the tap circuits should be activated (i.e., turned ON so that they can inject currents into the first and second current injection nodes 520A and 520B) only after the DFE feedback data $Q_0[2:0]$ have arrived. This ensures that only the correct polarities of the currents are injected into the first and second current injection nodes 520A and 520B, respectively. Indeed, at the relevant speeds discussed herein there may be no time for recovering from even a short amount of time in which the wrong polarities are injected. Another advantage of the RZ tap structure is that the turn-on of the injection current is controlled by a low-jitter clock ($CLK_{IH1}$) rather than by the arrival time of the $Q_0[2:0]$ data, which can vary from cycle to cycle due to clock-to-Q delay variations of the latches.

Figure 5B:
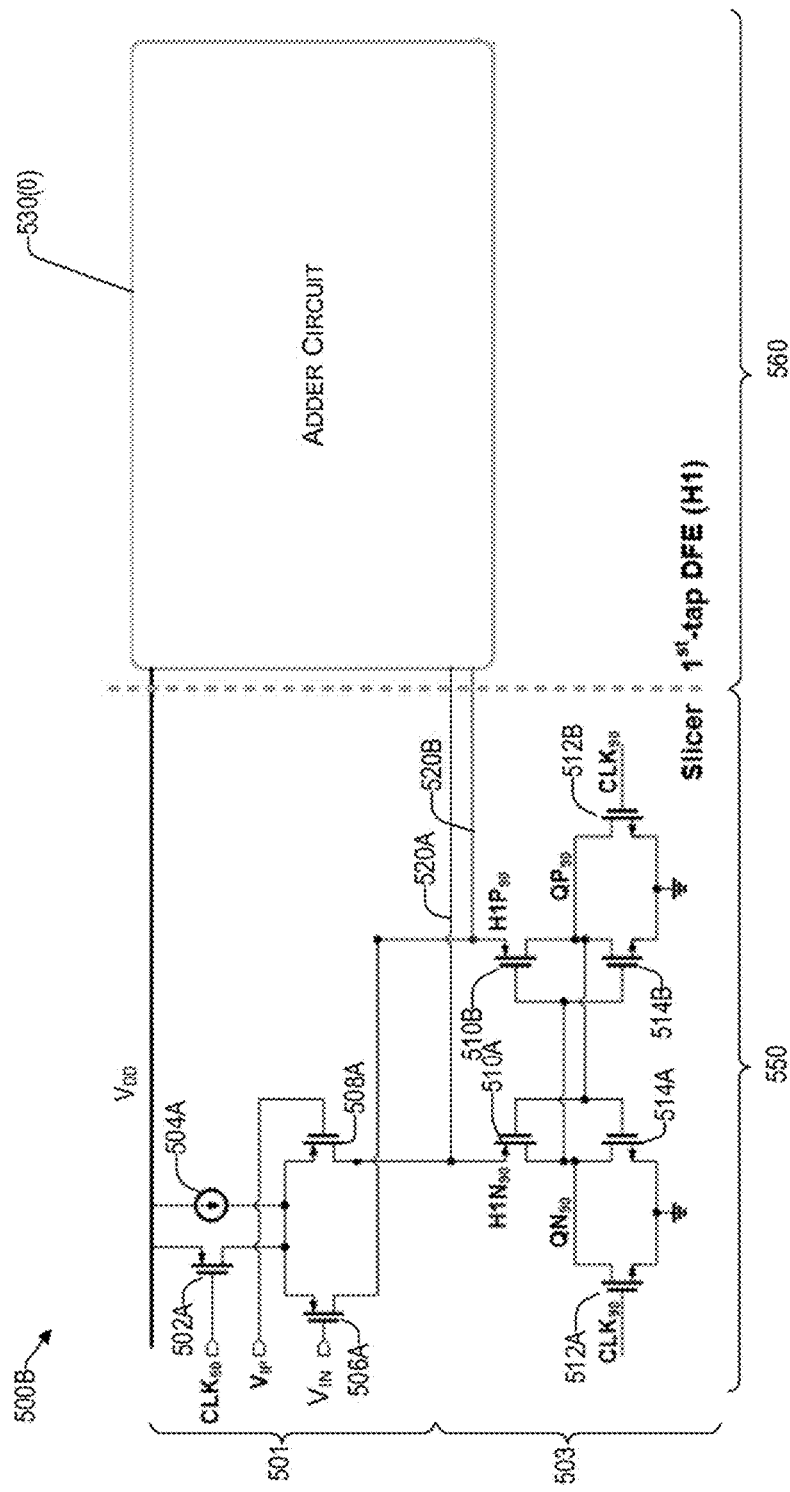
FIG. 5B illustrates an adding slicer without a reference input, consistent with an illustrative embodiment.

While FIGS. 4 and 5A illustrate differential architectures by way of example, single ended implementations are within the scope and spirit of the present disclosure. In one embodiment, a reference voltage signal is not provided. For example, a decision-making slicer circuit for an NRZ system may operate without such differential reference voltage signal. To that end, FIG. 5B illustrates an adding slicer 500B without a reference input, consistent with an illustrative embodiment. By way of comparative example, adding slicer 500B does not include components 502B, 504B, 506B, and 508B. Further, it only includes a single adder circuit 530(0). Instead of relying on the differential reference voltage input $V_{REF}p/V_{REFN}$, the adding slicer 500B simply evaluates the $V_{IP}-V_{IN}$ differential signal via the input stage 501.

Clock Skew Between the Clocks of the Slicer and the 1 Tap DFE Feedback Circuit

In principle, the clock used to drive the (e.g., RZ) taps ($CLK_{IH1}$) could be the same as the clock (e.g. $CLK_{90}$) that activates the decision-making slicer circuit. However, when the clocks are the same, there is a risk that, due to circuit delays, the DFE compensation that is provided by taps 430(0) to 430(2) may be applied too late to have the desired influence on the data decisions made by the decision-making slicer circuit 550. For example, since the first and second current injection nodes 520A and 520B would have very little time to start responding to the injected currents before the latch 550 produces its decisions, the injected currents would have only a weak effect on the latch operation. In other words, the effective tap weight (as measured by the shift in input-referred latch threshold) is small (e.g., too small to compensate for the ISI from the previous symbol). In this regard, in some embodiments, a skew is introduced between the clock controlling the slicer portion (e.g., $CLK_{90}$) and the clock controlling the taps 430(0) to 430(2) (i.e., $CLK_{IH1}$). Thus, $CLK_{IH1}$ is skewed earlier in phase than the clock $CLK_{90}$.

Figure 6:
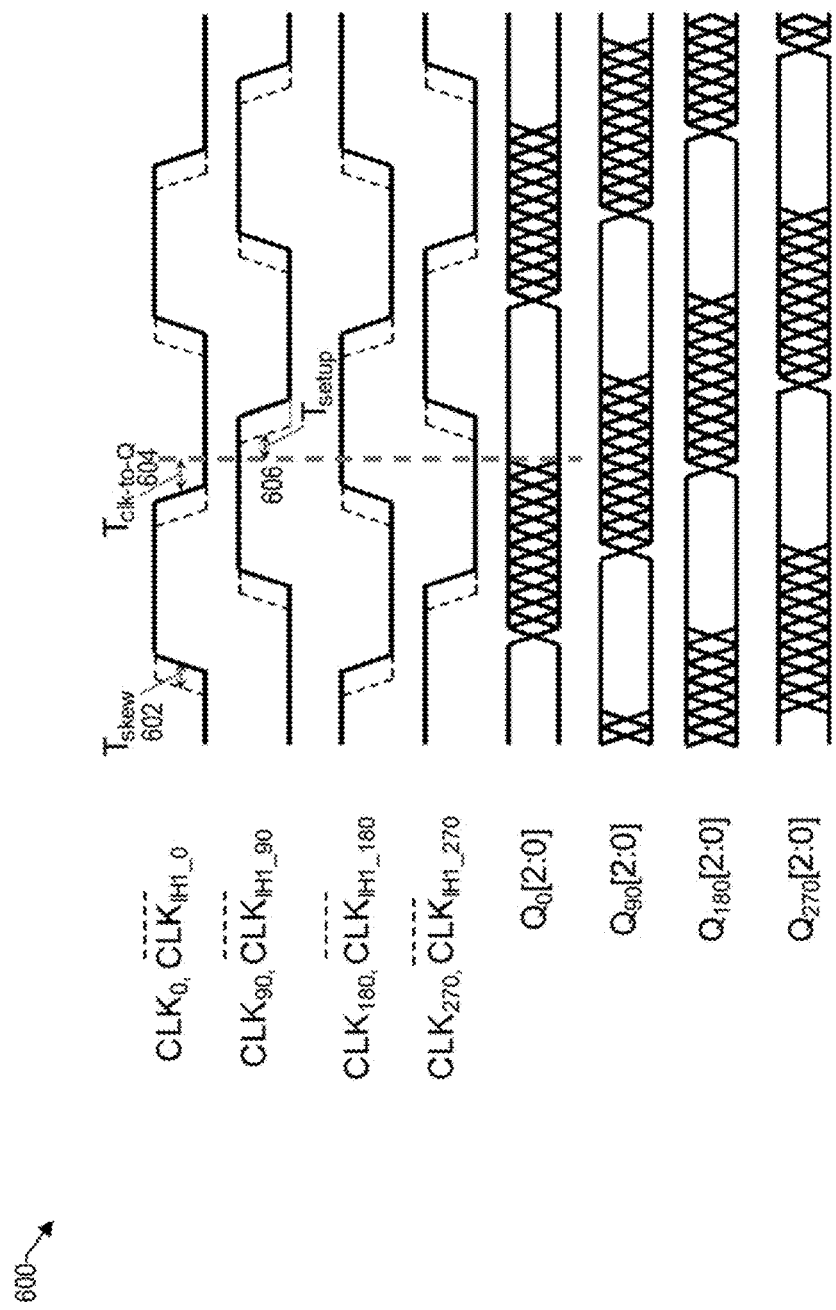
FIG. 6 is an example timing diagram that illustrates a skew between a first clock and a second clock for a PAM4 architecture DFE.

FIG. 6 is an example timing diagram that illustrates a skew between a first clock (e.g., $CLK_{90}$) and a second clock ($CLK_{IH1\_90}$) for a PAM4 architecture DFE. A significant increase in the effective tap weight can be obtained by adding some skew ($T_{skew}$) 602 between the clock $CLK_{IH1\_90}$ and the clock of the decision-making slicer circuit (e.g., $CLK_{90}$), so that the $1^{st}$-tap DFE (H1) feedback circuit 560 can inject their currents into the first and second current injection nodes 520A and 520B at a predetermined time (e.g., at least a few picoseconds) before the latch 550 is activated. For the introduced clock skew 602 to be effective, the previous symbol (e.g., $Q_0[2:0]$) should come even earlier than $CLK_{IH1\_90}$ by a predetermined setup time 606.

Figure 7:
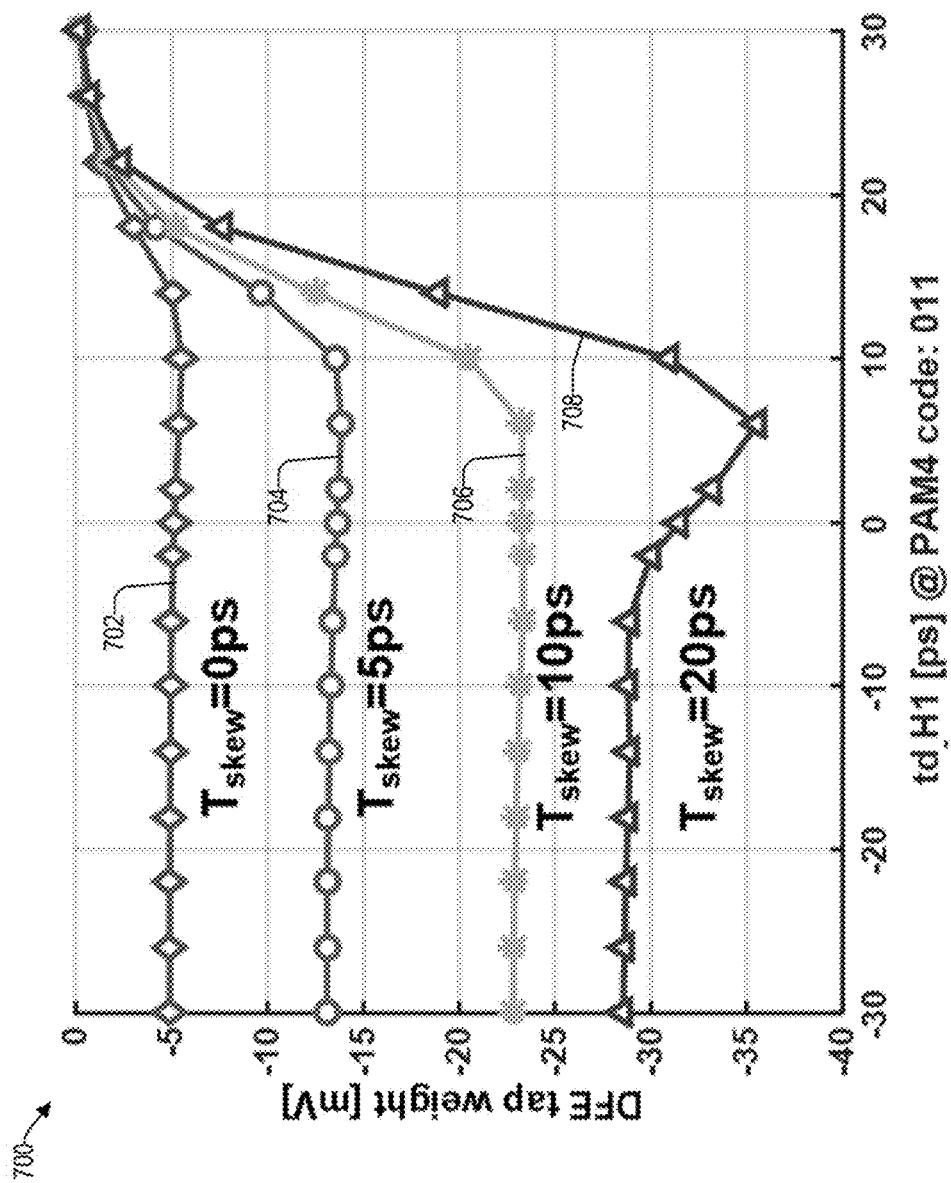
FIG. 7 is an example graph of the DFE tap weight vs. the arrival time of the data for different clock skews between a decision-making slicer circuit and a corresponding feedback adder circuit of a 1 tap DFE.

Reference now is made to FIG. 7, which is an example graph 700 of the DFE tap weight vs. the arrival time of the data (e.g., $Q_0(0)$) for different clock skews between the decision-making slicer circuit 550 and the corresponding feedback adder circuit 530(0) of the 1 tap DFE. (The arrival time of the data is measured relative to the clock of the decision-making slicer circuit 550.) As a reference, curve 702 has no timing skew between the clocks (i.e., $CLK_{90}$ and $CLK_{IH1}$). It therefore introduces a modest tap weight of only $-5$ mV. In contrast, curve 708 illustrates a response for a clock skew of 20 ps between $CLK_{IH1}$ and $CLK_{90}$. Put differently, $CLK_{IH1}$ arrives 20 ps before $CLK_{90}$. Such large timing skew provides the largest tap weight. However, it runs the risk that the data of $Q_0[0]$ may not have arrived in time. For proper operation and high accuracy (i.e., low sensitivity to variations in DFE feedback delays), the flat regions in the DFE tap weight curves of graph 700 should be used. Thus, for a clock skew of 20 ps to be effective, the data $Q_0[0]$ should arrive more than 5 ps earlier than the slicer clock to provide a DFE tap weight of approximately 28 mV, a timing requirement which may be difficult to achieve. Thus, in the example of FIG. 7, for normal operation, a skew of 10 ps may be selected as a compromise such that a pulling in of the timing of the data $Q_0[0]$ is not required.

Accordingly, in general, a larger $T_{skew}$ yields a larger tap weight. However, a larger value of $T_{skew}$ also entails a feedback loop delay penalty. Referring back to FIG. 6, the delay between the falling edge of $CLK_0$ and the data output $Q_0[2:0]$ (referred to herein as the $T_{clk-to-Q}$ delay 604) becoming valid equals the clock-to-Q delay of the decision-making slicer circuit 550. In a quarter-rate system, the quarter-rate clocks $CLK_0$, $CLK_{90}$, $CLK_{180}$, and $CLK_{270}$ are shifted by one unit interval (UI) with respect to each other, so the time between the falling edge of $CLK_0$ and the falling edge of $CLK_{90}$ equals 1UI. For the RZ tap to operate with the intended benefits, the $Q_0[2:0]$ data should arrive at the tap circuits before $CLK_{IH1}$ (in this case, $CLK_{IH1\_90}$) is switched low. If the setup time $T_{setup}$ 606 is defined as the time between the arrival of the valid $Q_0[2:0]$ data and the falling edge of $CLK_{IH1\_90}$, it follows that:

$$T_{setup} = 1UI - T_{clk-to-Q} - T_{skew} \qquad \text{(Eq. 1)}$$

Note that both the clock-to-Q delay of the decision-making slicer circuit 550 and $T_{skew}$ subtract from the available setup time for the DFE feedback tap circuit. Since $T_{setup}$ is positive (or nearly positive) for proper operation of the RZ tap circuit, there is an upper limit on the choice of $T_{skew}$, which can be chosen as a compromise between tap weight strength and feedback timing margins, as discussed in the context of FIG. 7.

Example Floorplan

Figure 8:
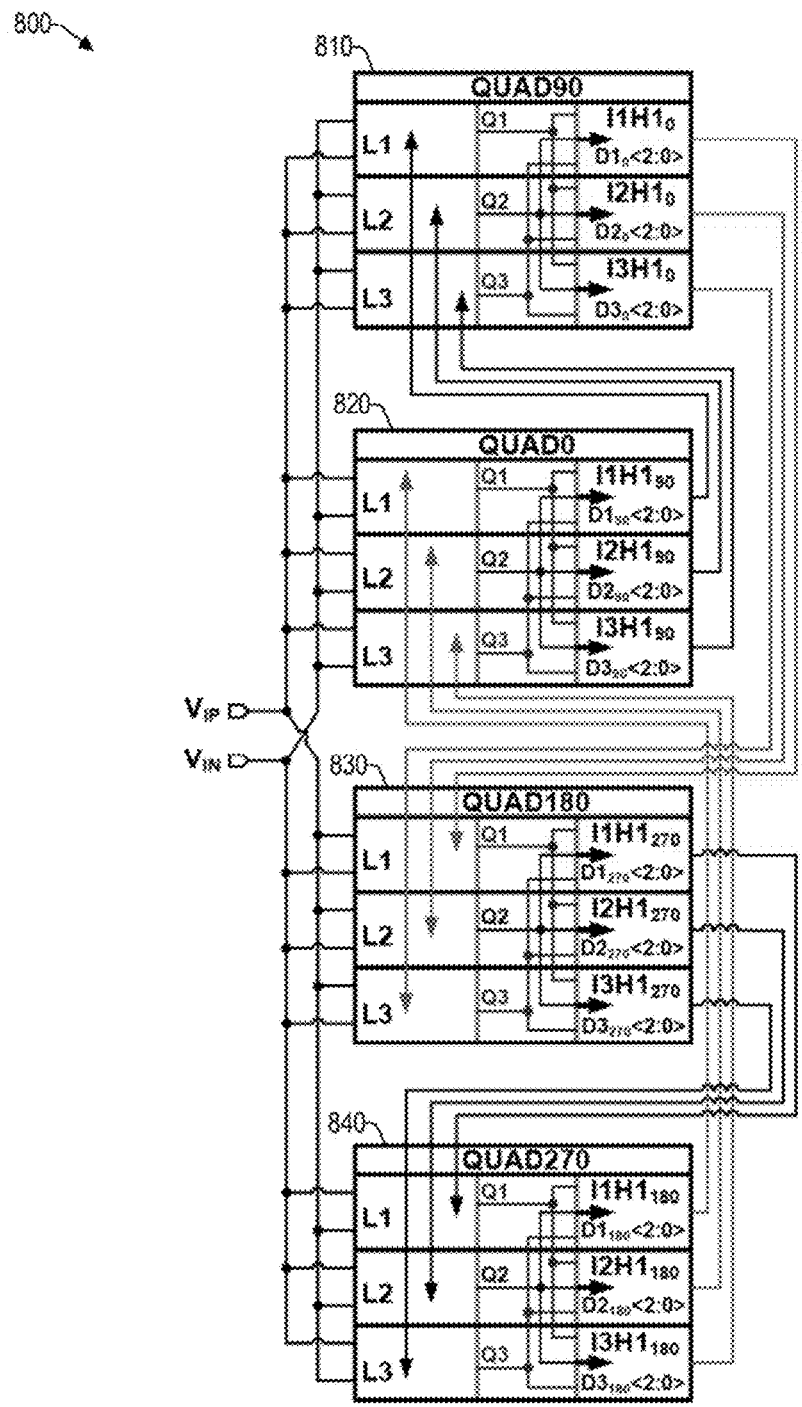
FIG. 8 is an example floorplan of a quarter-rate architecture PAM4 DFE, consistent with an illustrative embodiment.

FIG. 8 is an example floorplan 800 of a quarter-rate architecture PAM4 DFE, consistent with an illustrative embodiment. In the example of FIG. 8, the first (i.e., top-most) quadrature path 810 is that of phase 90; the second quadrature path 820 is that of phase 0; the third quadrature path 830 is that of phase 180; and the fourth quadrature path 840 is that of phase 270. Accordingly, the largest distance of a DFE feedback signal is the distance between two quadrants (e.g., between path 810 and path 830, thereby providing a floorplan with the least amount of overhead for wiring and the parasitics associated therewith.

By virtue of the floorplan 800 of FIG. 8, the wiring, real estate, and the corresponding parasitic effects of the signaling between the paths 810 to 840 is reduced, ultimately leading to better performance of a PAM4 quarter-rate DFE.

Example Results

Figure 9:
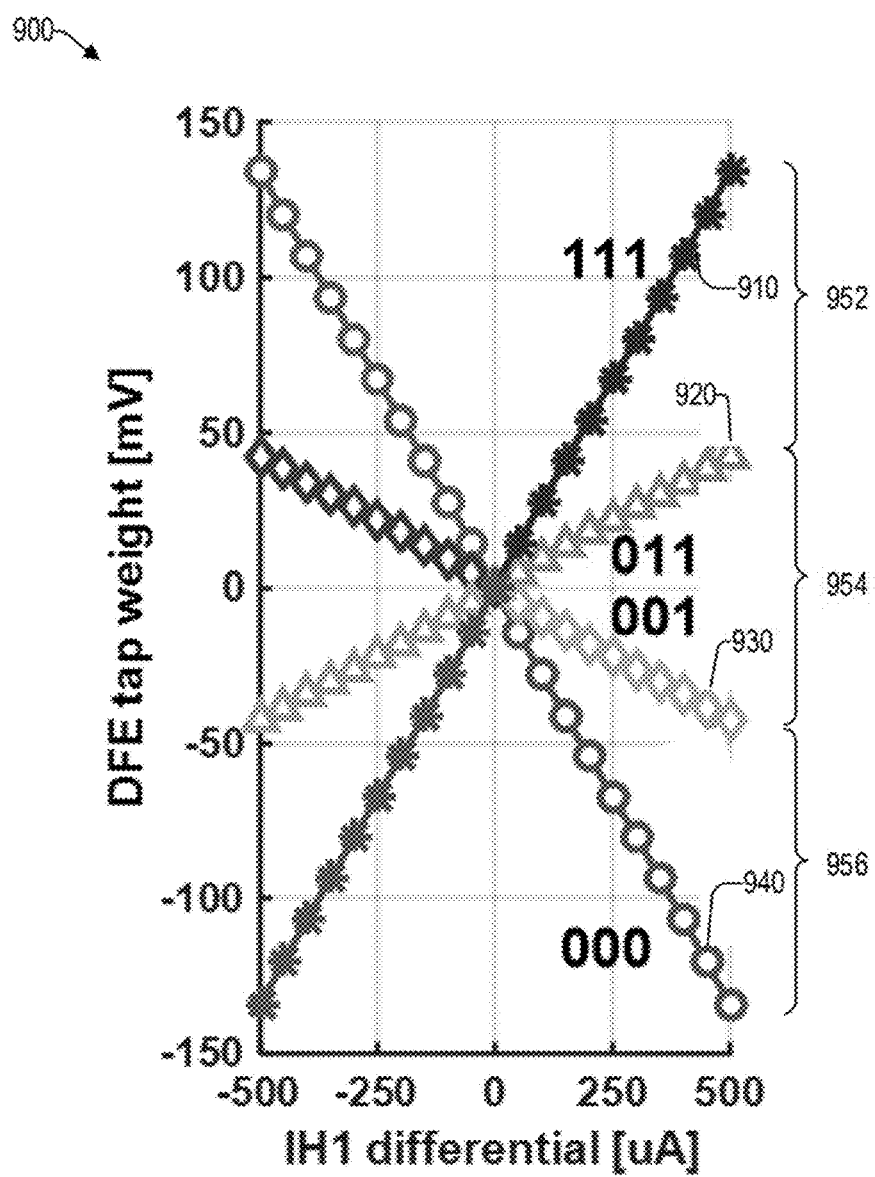
FIG. 9 illustrates an example graph of a DFE tap weight versus a differential tap weight current.

FIG. 9 illustrates an example graph 900 of the DFE tap weight versus the differential tap weight current ($H_{1P}$–$H_{1N}$ for the circuit of FIG. 5A). The DFE feedback signal (referred to the latch input) is measured for all four possible thermometer codes: 111 (represented by curve 910), 011 (represented by curve 920), 001 (represented by curve 930), and 000 (represented by curve 940). The largest DFE feedback signal is provided by the maximum and minimum thermometer codes when the differential between $H_{1P}$ and $H_{1N}$ is at a maximum.

Ideally, the amount of ISI that is being compensated should be linear. Put differently, the spacing between the curves at 500 uA IH1 differential, represented by distances 952, 954, and 956, should be the same. However, practical considerations due to compression effects in the adding slicer circuit, may make the spacing somewhat different. In one example implementation, for a 150 mV tap weight, the DFE tap weight variation is less than 10% (i.e., −1 dB).

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits, and advantages. These also include embodiments in which the components and/or steps are arranged and/or ordered differently. For example, bipolar transistors (e.g., PNP or NPN), JFETS, and/or BiCMOS can be used instead of strictly MOS transistors. Accordingly, it is intended that the application be limited only in terms of the appended claims. Further, any signal discussed herein may be scaled, buffered, scaled and buffered, converted to another mode (e.g., voltage, current, charge, time, etc.), or converted to another state (e.g., from HIGH to LOW and LOW to HIGH) without materially changing the underlying control method.

Aspects of the present disclosure are described herein with reference to a block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with illustrative embodiments, it is understood that the term "illustrative" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, various features are grouped together in various embodiments for streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A decision feedback equalizer (DFE), comprising:
a plurality of paths, each path having at least one adding slicer comprising:
   a decision-making slicer circuit comprising a first input, a second input coupled to a first clock signal that initiates a decision-making phase of the decision-making slicer circuit at a first edge of the first clock signal, an output, and a current injection input; and
   a plurality of adder circuits, each having an input operative to receive a respective bit of a digital code representing a previously decided symbol, fed back from an output of a prior path of the plurality of paths, and an input coupled to a second clock signal, wherein:
      the plurality of adder circuits are collectively configured to inject an offset current proportional to the digital code representing the previously decided symbol into the current injection input at a first edge of the second clock signal, and
      there is a predetermined skew between the first clock signal and the second clock signal to control a timing between the injection of the offset current of the plurality of adder circuits and the initiation of the decision-making phase of the decision-making slicer circuit.

2. The DFE of claim 1, wherein the DFE is configured to receive PAM4 input signals.

3. The DFE of claim 1, wherein the predetermined skew between the first clock signal and the second clock signal adjusts the timing of the injection of the offset current into the current injection input such that the injection is before the initiation of the decision-making phase.

4. The DFE of claim 1, wherein the decision-making slicer circuit further comprises a reference input.

5. The DFE of claim 4, wherein:
the first input of the decision-making slicer is differential;
the reference input is differential;
the output of the decision-making slicer is differential;
the current injection input is a differential input having a first node and a second node; and
the digital code received by the plurality of adder circuits is a differential thermometer code.

6. The DFE of claim 5, wherein the plurality of paths comprises:
a first path having three parallel adding slicers, each adding slicer having three adder circuits configured to receive the differential thermometer code from an output of a fourth path;
a second path having three parallel adding slicers, each adding slicer having three adder circuits configured to receive the differential thermometer code from an output of the first path;
a third path having three parallel adding slicers, each adding slicer having three adder circuits configured to receive the differential thermometer code from an output of the second path; and
the fourth path having three parallel adding slicers, each adding slicer having three adder circuits configured to receive the differential thermometer code from an output of the third path.

7. The DFE of claim 5:
wherein each decision-making slicer circuit comprises:
   an input stage comprising two differential pairs configured to receive a differential input voltage at the first differential input and a differential reference voltage at the reference differential input; and
   a set of cross-coupled inverters forming a latching circuit and configured to provide a rail to rail differential signal at the differential output,
wherein each decision-making slicer is configured to determine whether to provide a differential 1 or 0 at the differential output upon comparing the differential input voltage to the differential reference voltage after receiving the injected offset current at the differential current injection input, and
wherein receipt of the injected offset current shifts a threshold of the decision-making slicer circuit up or down depending on a polarity of the injected offset current.

8. The DFE of claim 7, wherein a size of the shift of the threshold of the decision-making slicer circuit is based on a magnitude of the injected offset current.

9. The DFE of claim 7, wherein the input stage comprises:
a first transistor having a source coupled to a first supply and a gate coupled to the first clock signal,
a second transistor having a source coupled to a drain of the first transistor, a gate coupled to a positive side of the differential reference input, and a drain coupled to the second current injection node;

a third transistor having a source coupled to the drain of the first transistor, a gate coupled to a positive side of the differential input, and a drain coupled to the first current injection node;

a fourth transistor having a source coupled to the first supply and a gate coupled to the first clock signal;

a fifth transistor having a source coupled to a drain of the fourth transistor, a gate coupled to a negative side of the differential reference input, and a drain coupled to the first current injection node; and a sixth transistor having a source coupled to the drain of the fourth transistor, a gate coupled to the negative side of the differential input, and a drain coupled to the second current injection node.

10. The DFE of claim 7, wherein the set of cross-coupled inverters comprises:

a first transistor having a source coupled to the first current injection node, a drain coupled to a negative side of a differential output, and a gate coupled to a positive side of the differential output;

a second transistor having a drain coupled to the negative side of the differential output, a gate coupled to the positive side of the differential output, and a source coupled to a second supply; and a third transistor having a drain coupled to the negative side of the differential output, a gate coupled to the first clock signal, and a source coupled to the second supply;

a fourth transistor having a source coupled to the second current injection node, a drain coupled to the positive side of a differential output, and a gate coupled to the negative side of the differential output;

a fifth transistor having a drain coupled to the positive side of the differential output, a gate coupled to the negative side of the differential output, and a source coupled to the second supply; and a sixth transistor having a drain coupled to the positive side of the differential output, a gate coupled to the first clock signal, and a source coupled to the second supply.

11. The DFE of claim 5, wherein each adder circuit comprises:

a first current source having a first node coupled to a first supply;

a first transistor having a source coupled to a second node of the first current source, and a gate coupled to the second clock;

a second transistor having a source coupled to a drain of the first transistor, a gate configured to turn ON or OFF the second transistor, and a drain coupled to the second current injection node; and a third transistor having a source coupled to the drain of the first transistor, a gate configured to turn ON or OFF the third transistor, and a drain coupled to the first current injection node, wherein the gates of the second and third transistors are configured to receive a respective differential bit of the differential thermometer code.

12. The DFE of claim 11, wherein each adder circuit further comprises a fourth transistor having a source coupled to the second node of the first current source, a drain coupled to the second supply, and a gate coupled to an inverse of the second clock.

13. The DFE of claim 11, wherein each adder circuit further comprises:

a second current source having a first node coupled to the first supply;

a fourth transistor having a source coupled to a second node of the second current source, and a gate coupled to the second clock;

a fifth transistor having a source coupled to a drain of the fourth transistor, a gate configured to turn ON or OFF the fifth transistor, and a drain coupled to the first current injection node; and a sixth transistor having a source coupled to the drain of the fourth transistor, a gate configured to turn ON or OFF the sixth transistor, and a drain coupled to the second current injection node, wherein the gates of the fifth and sixth transistors are configured to receive a respective differential bit of the differential thermometer code.

14. The DFE of claim 13, wherein each adder circuit further comprises:

a seventh transistor having a source coupled to the second node of the first current source, a drain coupled to the second supply, and a gate coupled to an inverse of the second clock; and an eighth transistor having a source coupled to the second node of the second current source, a drain coupled to the second supply, and a gate coupled to the inverse of the second clock.

15. The DFE of claim 5, further comprising a thermometer to binary converter coupled to the differential output of each path, respectively.

16. The DFE of claim 5, wherein a level of the differential reference input is programmable.

17. A method of equalizing in a decision feedback equalizer having a plurality of paths, the method comprising:

receiving, by a plurality of adder circuits, a digital code representing a previously decided symbol from an output of a prior path of the plurality of paths, wherein each adder circuit receives a respective bit of the digital code;

receiving, by a decision-making slicer circuit, an input voltage;

receiving, by the decision-making slicer circuit, a first clock signal operative to initiate a decision-making phase of the decision-making slicer circuit;

receiving, by the plurality of adder circuits, a second clock signal operative to initiate an injection of an offset current into a current injection input of the decision-making slicer circuit;

injecting, by the plurality of adder circuits, the offset current proportional to the digital code representing the previously decided symbol into the current injection input, at a first edge of the second clock signal; and introducing a predetermined skew between the first clock signal and the second clock signal.

18. The method of claim 17, wherein:

the digital code representing the previously decided symbol received by the plurality of adder circuits is a differential thermometer code;

the input voltage received by the decision-making slicer circuit is differential; and the injected offset current proportional to the digital code is differential.

19. The method of claim 18, further comprising:

receiving, by the decision-making slicer circuit, a differential reference voltage; and comparing, by the decision-making slicer circuit, the differential input voltage to the differential reference voltage, after receiving the offset current proportional to the digital code representing the previously decided symbol, wherein receipt of the injected offset current shifts a threshold of the decision-making slicer circuit, up or down, depending on a polarity of the injected offset current.

20. The method of claim 19, wherein a size of the shift of the threshold of the decision-making slicer circuit is based on a magnitude of the injected offset current.

21. The method of claim 18, wherein the received differential input signal is a PAM4 signal.

22. The method of claim 17, wherein the predetermined skew between the first clock signal and the second clock signal is such that the injection of the offset current is before the initiation of the decision-making phase.

23. A decision feedback equalizer (DFE), comprising:

a plurality of paths, each path having at least one adding slicer comprising:

a decision-making slicer circuit comprising a first input, a second input coupled to a first clock signal that initiates a decision-making phase of the decision-making slicer circuit at a first edge of the first clock signal, an output, and a current injection input; and an adder circuit having an input operative to receive a respective bit of a digital code representing a previously decided symbol, fed back from an output of a prior path of the plurality of paths, and an input coupled to a second clock signal, wherein:

the adder circuit is configured to inject an offset current proportional to the digital code representing the previously decided symbol into the current injection input at a first edge of the second clock signal, and there is a predetermined skew between the first clock signal and the second clock signal to control a timing between the injection of the offset current of the adder circuit and the initiation of the decision-making phase of the decision-making slicer circuit.

24. The DFE of claim 23, wherein the DFE is configured to receive non-return-to-zero (NRZ) signals at its first input.

* * * * *